United States Patent
DeChristofaro et al.

(10) Patent No.: US 11,261,114 B2
(45) Date of Patent: Mar. 1, 2022

(54) AEROBIC TREATMENT SYSTEM

(71) Applicants: David DeChristofaro, Niles, OH (US); Michael Broeker, Pittsburgh, PA (US); Berry L. Meadows, Warren, OH (US); Thomas A. Joseph, III, Pittsburgh, PA (US)

(72) Inventors: David DeChristofaro, Niles, OH (US); Michael Broeker, Pittsburgh, PA (US); Berry L. Meadows, Warren, OH (US); Thomas A. Joseph, III, Pittsburgh, PA (US)

( * ) Notice: Subject to any disclaimer, the term of this patent is extended or adjusted under 35 U.S.C. 154(b) by 377 days.

(21) Appl. No.: 15/215,928

(22) Filed: Jul. 21, 2016

(65) Prior Publication Data

US 2017/0022080 A1 Jan. 26, 2017

Related U.S. Application Data

(60) Provisional application No. 62/194,956, filed on Jul. 21, 2015.

(51) Int. Cl.
*C02F 9/00* (2006.01)
*B01D 1/00* (2006.01)
(Continued)

(52) U.S. Cl.
CPC .............. *C02F 9/00* (2013.01); *B01D 1/0064* (2013.01); *B01D 1/20* (2013.01); *B01D 21/02* (2013.01);
(Continued)

(58) Field of Classification Search
None
See application file for complete search history.

(56) References Cited

U.S. PATENT DOCUMENTS

| 1,445,134 A | 2/1923 | Fowler |
| 2,460,482 A | 2/1949 | Abbot |

(Continued)

FOREIGN PATENT DOCUMENTS

| DE | 29620639 U1 | 1/1997 |
| DE | 29521272 U1 | 2/1997 |

(Continued)

OTHER PUBLICATIONS

U.S. Pat. No. 734,486, issued Jul. 21, 1903 to Wilson.
(Continued)

*Primary Examiner* — Jonathan M Peo
(74) *Attorney, Agent, or Firm* — The Webb Law Firm

(57) ABSTRACT

An aerobic treatment system is disclosed herein in which an aerobic holding treatment tank, having an inlet adapted to receive wastewater and an outlet adapted to discharge treated wastewater therefrom, is in communication with an aeration pump having an inlet nozzle in communication with the aerobic holding treatment tank for providing a source of air to the contents of the aerobic holding treatment tank. The aerobic treatment system may further include a generation pump disposed below ground level and in fluid communication with the aerobic holding treatment tank. The generation pump is provided in fluid communication with a high pressure pump in fluid access with an evaporator fan and misting nozzle. The system may further include electronics to connect to grid power, backup electronics for connection to auxiliary power sources, and at least one solar collector for providing a source of electricity.

17 Claims, 1 Drawing Sheet

(51) Int. Cl.
*B01D 1/20* (2006.01)
*B01D 21/02* (2006.01)
*C02F 1/04* (2006.01)
*C02F 3/02* (2006.01)
*C02F 1/00* (2006.01)
*C02F 1/12* (2006.01)
*C02F 1/32* (2006.01)

(52) U.S. Cl.
CPC .............. *C02F 1/048* (2013.01); *C02F 1/004* (2013.01); *C02F 1/12* (2013.01); *C02F 1/32* (2013.01); *C02F 3/02* (2013.01); *C02F 2201/009* (2013.01); *C02F 2203/002* (2013.01); *Y02A 20/212* (2018.01); *Y02W 10/10* (2015.05); *Y02W 10/37* (2015.05)

(56) References Cited

U.S. PATENT DOCUMENTS

| | | |
|---|---|---|
| 2,909,171 A | 10/1959 | Lof |
| 3,390,056 A | 6/1968 | Ingram |
| 3,415,719 A | 12/1968 | Telkes |
| 3,775,257 A | 11/1973 | Lovrich |
| 3,801,474 A | 4/1974 | Castellucci et al. |
| 3,870,605 A | 3/1975 | Sakamoto |
| 3,905,352 A | 9/1975 | Jahn |
| 3,998,206 A | 12/1976 | Jahn |
| 4,075,063 A | 2/1978 | Tsay et al. |
| 4,089,750 A | 5/1978 | Kirschman et al. |
| 4,135,985 A | 1/1979 | La Rocca |
| 4,194,949 A | 3/1980 | Stark |
| 4,209,363 A | 6/1980 | Ramer |
| 4,213,864 A * | 7/1980 | Asikainen ................ C02F 3/04 210/151 |
| 4,219,387 A | 8/1980 | Gruntman |
| 4,249,515 A | 2/1981 | Page |
| 4,252,107 A | 2/1981 | Horton |
| 4,312,709 A | 1/1982 | Stark et al. |
| 4,318,781 A | 3/1982 | Iida |
| 4,325,788 A | 4/1982 | Snyder |
| 4,329,205 A | 5/1982 | Tsumara et al. |
| 4,371,623 A | 2/1983 | Taylor |
| 4,373,996 A | 2/1983 | Maruko |
| 4,377,441 A | 3/1983 | Kimmell et al. |
| 4,498,959 A | 2/1985 | Sakamoto |
| 4,525,242 A | 6/1985 | Iida |
| 4,536,258 A | 8/1985 | Huhta-Koivisto |
| 4,568,156 A | 2/1986 | Dane |
| 4,612,914 A | 9/1986 | Dogey |
| 4,664,751 A | 5/1987 | Lloyd |
| 4,687,550 A | 8/1987 | Wong |
| 4,756,802 A | 7/1988 | Finney |
| 4,921,580 A | 5/1990 | Martes et al. |
| 4,959,127 A | 9/1990 | Michna |
| 5,053,110 A | 10/1991 | Deutsch |
| 5,181,991 A | 1/1993 | Deutsch |
| 5,348,622 A | 9/1994 | Deutsch et al. |
| 5,441,632 A * | 8/1995 | Charon .............. B01D 21/0096 210/170.08 |
| 5,628,879 A | 5/1997 | Woodruff |
| 5,645,693 A | 7/1997 | Gode |
| 5,650,050 A | 7/1997 | Kaufmann |
| 5,744,008 A | 4/1998 | Craven |
| 5,932,074 A | 8/1999 | Hoiss |
| 6,001,222 A | 12/1999 | Klein |
| 6,299,775 B1 * | 10/2001 | Elston ................ C02F 9/00 210/605 |
| 6,663,750 B1 | 12/2003 | Coon |
| 6,767,433 B2 | 7/2004 | Foster et al. |
| 6,797,124 B2 | 9/2004 | Ludwig |
| 6,897,832 B2 | 5/2005 | Essig, Jr. et al. |
| 7,067,044 B1 | 6/2006 | Coon |
| 7,153,395 B2 | 12/2006 | Foster et al. |
| 7,264,695 B2 | 9/2007 | Foster et al. |
| 7,296,410 B2 | 11/2007 | Litwin |
| 7,507,316 B2 | 3/2009 | Ward |
| 7,955,478 B2 | 6/2011 | McClure |
| 8,246,786 B2 | 8/2012 | Cap et al. |
| 10,953,341 B2 | 3/2021 | Joseph, III et al. |
| 2002/0139656 A1 | 10/2002 | Reid |
| 2002/0179425 A1 | 12/2002 | Dableh |
| 2003/0150704 A1 | 8/2003 | Posada |
| 2005/0126170 A1 | 6/2005 | Litwin |
| 2007/0062799 A1 | 3/2007 | Lee |
| 2007/0090202 A1 | 4/2007 | Hsia |
| 2007/0108038 A1 | 5/2007 | Lee et al. |
| 2008/0073198 A1 | 3/2008 | Simon |
| 2008/0164135 A1 | 7/2008 | Slook |
| 2008/0190755 A1 | 8/2008 | McClure |
| 2012/0228117 A1 * | 9/2012 | Panunzio ................ C02F 9/00 203/10 |
| 2013/0098848 A1 * | 4/2013 | Frigon ................ C02F 1/00 210/749 |
| 2014/0027528 A1 * | 1/2014 | Attey ................ F24F 5/0035 239/1 |

FOREIGN PATENT DOCUMENTS

| | | |
|---|---|---|
| DE | 202004003380 U1 | 7/2004 |
| DE | 102004025189 A1 | 2/2005 |
| FR | 536920 A | 5/1922 |
| FR | 1016406 A | 11/1952 |
| JP | 10504998 T | 5/1998 |
| JP | 2004160301 A | 6/2004 |

OTHER PUBLICATIONS

U.S. Pat. No. 744,367, issued Nov. 17, 1903 to De Lautreppe.
U.S. Pat. No. 313,163 issued March 3, 1885 to Berry.
Boyle, Rebecca, "What Comes After Hubble?", Popular Science, May 6, 2009. Available online at: https://www.popsci.com/military-aviation-amp-space/article/2009-05/what-comes-after-hubble.
"Mylar Bags", Sorbentsystems, Dec. 21, 2007 (date obtained from wayback machine). Available online at https://www.sorbentsystems.com/mylar.html.
"What is mylar", Sorbentsystems. Available online at: https://www.sorbentsystems.com/mylarinfo.html.
Fedkin et al. "2.4 Concentration with a Parabolic Reflector", PennState. Available online at: https://www.e-education.psu.edu/eme812/node/557.
U.S. Pat. No. 687,262 issued Nov. 26, 1901 to Powers.
U.S. Pat. No. 509,282 issued Nov. 21, 1893 to Beck.
U.S. Appl. No. 61/244,314.
U.S. Appl. No. 61/363,877.
U.S. Appl. No. 62/194,956.
U.S. Appl. No. 62/139,991.
U.S. Appl. No. 62/139,986.

* cited by examiner

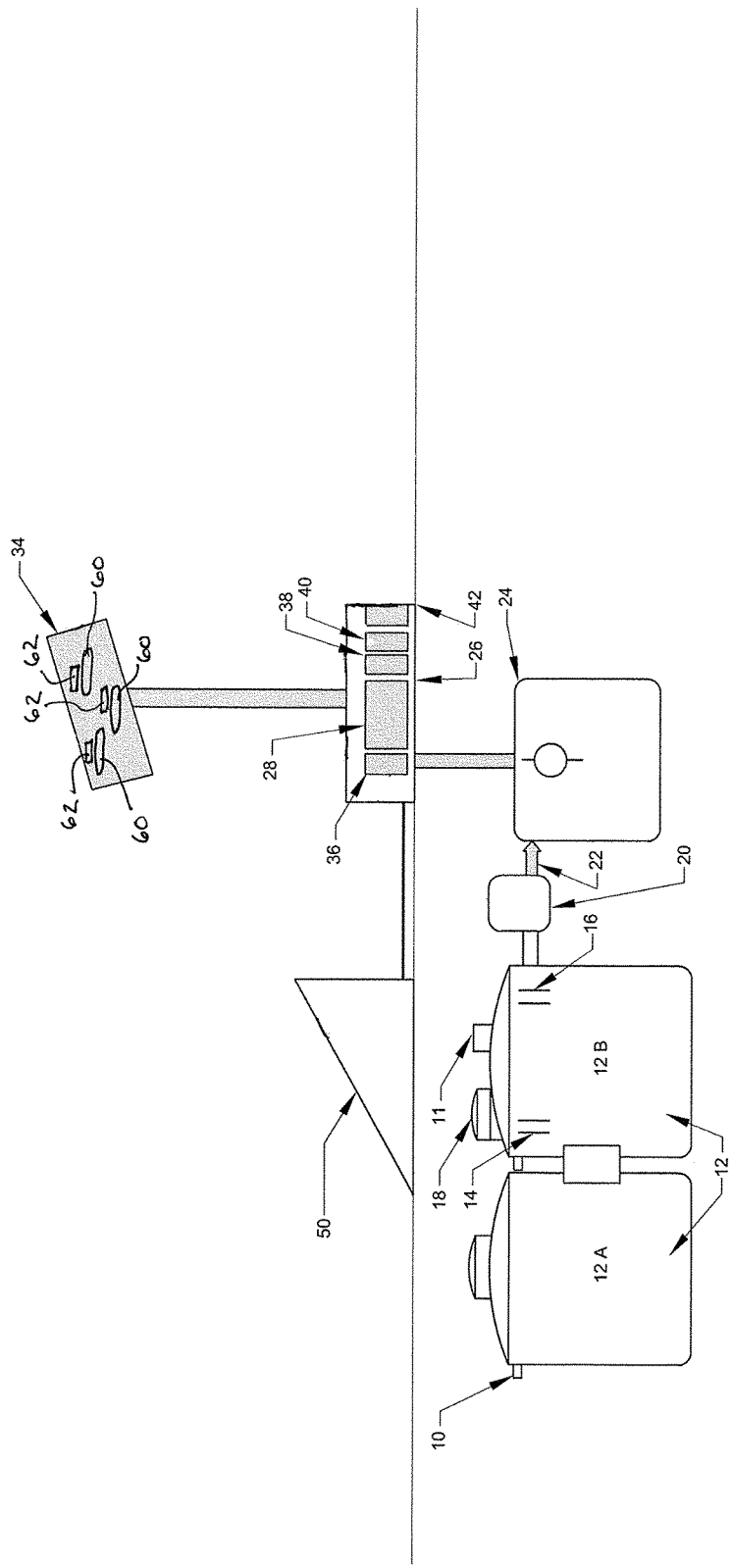

AEROBIC TREATMENT SYSTEM

CROSS-REFERENCE TO RELATED APPLICATION

The present application claims priority to U.S. Provisional Application Ser. No. 62/194,956, entitled "Solar Septic Treatment System", and filed Jul. 21, 2015, the entire disclosure of which is hereby incorporated by reference.

BACKGROUND OF THE INVENTION

Field of the Invention

The present invention is directed to aerobic treatment systems and, more particularly, is directed to a septic treatment system that utilizes evaporation to reduce and/or eliminate the need for soil absorption.

Description of Related Art

Septic systems and aerobic treatment systems have been conventionally used to treat wastewater in geographic areas in which a centralized sewage system is prohibitive or not cost-effective. In many instances, conventional septic systems may not be suitable for use in areas in which insufficient land is available to provide for proper leech fields, or in areas in which the soil conditions are inappropriate to provide the necessary retention times and drainage. In some communities, the water table is too high to allow the leech field adequate treatment processing time before the wastewater encounters the resident groundwater.

In areas in which septic systems are inappropriate for use, aerobic treatment units may be used to treat wastewater. Unlike conventional septic systems which utilize anaerobic treatment zones and soil absorption methodologies, aerobic treatment systems involve aerobic treatment zones which are driven by introduction of additive oxygen. Bacteria which thrive in oxygen-rich environments break down wastewater constituents within a holding tank into which air or oxygen is introduced. In certain cases, the wastewater may be subject to a pretreatment before it enters the aerobic holding treatment tank, and the treated wastewater exiting the aerobic holding tank may also be subject to additional post-treatment processing and disinfectant before it is discharged to the environment.

The addition of oxygen to the aerobic holding treatment tank is accomplished by a mechanism which injects and circulates air within a treatment tank. Because most aerobic holding treatment tanks are buried below ground-level the air must be forced into the aeration chamber by an injection blower, or be drawn into the aeration chamber by rotational Venturi. The injection and circulation of air is driven by electricity, and the generation of such electricity typically adds to the operational costs of aerobic treatment systems, including additional maintenance expenses.

Accordingly, a need exists for a wastewater treatment system in which the operational costs of an aerobic treatment system are reduced.

In addition, before wastewater leaving conventional aerobic holding treatment tanks can be properly returned to the environment, the wastewater may require a final clarifying treatment or disinfection. Methods for clarifying treatment include filters, drainage fields and/or evapotranspiration beds. Sand filters can be used as a final clarifying treatment process in which the exiting wastewater is pumped over layers of sand, gravel or other filters which help further purify the wastewater. Other types of filters can be used as well. Drainage fields utilize bacteria resident in the surrounding soil to further purify the wastewater. In use, both filters and drainage fields require significant space and can become clogged with residual components of the wastewater exiting the aerobic holding treatment tank, thereby reducing efficiency. Evapotranspiration beds utilize natural vegetation and evaporation to finally clarify effluent wastewater. Evapotranspiration beds are less commonly used in final clarifying treatment as they are expensive to maintain and require significant retention times to be effective. Each of these identified final clarifying treatment processes require physical land requirements and additional land application to achieve sufficient water cleanness prior to discharge to groundwater.

A further need exists for a wastewater treatment system in which the post-treatment processing is easily managed, requires minimal land application, and is cost-effective.

SUMMARY OF THE INVENTION

In accordance with an embodiment of the present invention, a wastewater treatment system includes a waste holding tank, having an inlet for receiving a waste stream, and an outlet for directing a fraction of the waste stream from the waste holding tank. The system also includes a waste stream purification device having an inlet for receiving the fraction of the waste stream from the waste holding tank. The system further includes a pressure pump having an inlet provided in fluid communication with the outlet of the waste stream purification device for directing a purified water stream to an elevated evaporation module. The elevated evaporation module includes at least one fan and at least one fluid directing nozzle adjacent the fan, the at least one fluid directing nozzle configured for directing the purified water stream from the waste stream purification device and pumped by the pressure pump to the at least one fan. The at least one fan and the at least one nozzle are configured to form a mist from the purified water stream.

In certain configurations, the waste holding tank includes a primary settling tank and a secondary settling tank. Alternatively, the waste holding tank may include a primary settling region and a secondary settling region.

The waste stream purification device may include a secondary clarifier in fluid communication with the outlet of the waste holding tank. A generation pump may also be provided in fluid communication with at least one of the outlet of the waste holding tank and an outlet of the secondary clarifier, the generation pump having an outlet in fluid communication with the inlet of the pressure pump.

In certain configurations, the waste stream purification device may include a UV disinfection device. An effluent from at least one of a secondary clarifier and the outlet of the waste holding tank may be directed through the UV disinfection device, and the UV disinfection device may have an outlet in fluid communication with the inlet of the pressure pump.

In other configurations, the waste stream purification device may include a fine particulate filter. An effluent from at least one of a secondary clarifier, the outlet of the waste holding tank, a generation pump, and an outlet of the UV disinfection device may be directed through the fine particulate filter, and the fine particulate filter may have an outlet in fluid communication with the inlet of the pressure pump.

Optionally, at least one solar collector 50 may be provided in electrical communication with at least one of the pressure pump and the elevated evaporation module for providing a source of power thereto. The elevated evaporation module may be raised above a ground level from about 6 to about 30 feet.

In certain configurations, the at least one nozzle is provided above the at least one fan. In other configurations, the mist is made of water droplets having a diameter of between 50 μm and 250 μm.

In accordance with another embodiment of the present invention, a wastewater treatment system includes a waste holding tank, having an inlet for receiving a waste stream, and an outlet for directing a fraction of the waste stream from the waste holding tank. The system also includes a secondary clarifier in fluid communication with the outlet of the waste holding tank, with the secondary clarifier having an outlet. The system also includes a generation pump in fluid communication with the outlet of the secondary clarifier, with the generation pump having an outlet. The system further includes a pressure pump having an inlet provided in fluid communication with the outlet of the generation pump for directing a purified water stream to an elevated evaporation module. The elevated evaporation module includes at least one fan and at least one fluid directing nozzle adjacent the fan. The at least one fluid directing nozzle is configured for directing the purified water stream from the waste stream purification device and pumped by the pressure pump to the at least one fan, and the at least one fan and the at least one nozzle are configured to form a mist from the purified water stream.

In certain configurations, the system also includes a UV disinfection device, wherein an effluent from the generation pump is directed through the UV disinfection device, and the UV disinfection device has an outlet in fluid communication with the inlet of the pressure pump.

In other configurations, the system also includes a fine particulate filter, wherein an effluent from the generation pump is directed through the fine particulate filter, and the fine particulate filter has an outlet in fluid communication with the inlet of the pressure pump.

The elevated evaporation module may be raised above a ground level from about 6 to about 30 feet. The at least one nozzle may optionally be provided above the at least one fan, and the mist may be formed of water droplets having a diameter of between 50 μm and 250 μm.

BRIEF DESCRIPTION OF THE DRAWING

FIG. 1 is an aerobic treatment system in accordance with an embodiment of the present invention.

DETAILED DESCRIPTION

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Referring to FIG. 1, wastewater from a commercial or residential source may enter an inlet 10 of an aerobic holding treatment tank 12. Aerobic holding treatment tank 12 may be disposed below ground-level and can have any appropriate volume sufficient to accommodate the inlet load. In certain configurations, the aerobic holding treatment tank 12 may be a two tank configuration including a primary settling tank 12A, for gravitational settling of large solids, and a secondary settling tank 12B, for gravitational settling of lighter fractions of wastewater. In other configurations, the aerobic holding treatment tank 12 may be a single tank configuration having both a primary settling region and a secondary settling region. The aerobic treatment holding tank 12, and/or primary settling tank 12A and/or secondary settling tank 12B, may include an inlet baffle 14 provided adjacent the inlet 10 for enabling separation of the inlet wastewater into a scum and grease component having a lighter density, and a sludge component having a greater density. The aerobic holding treatment tank 12, and/or primary settling tank 12A and/or secondary settling tank 12B, may include a settling region in which suspended solids may be reduced by gravitational settling. The aerobic holding treatment tank 12, and/or primary settling tank 12A and/or secondary settling tank 12B, also includes at least one aerator 11 for introducing air thereto. Aerobic treatment holding tank 12, and/or primary settling tank 12A and/or secondary settling tank 12B, also includes an outlet 16 structured to remove at least a component of the resident wastewater, such as a fraction primarily constituting the sludge component. An optional access port 18 may be provided between the inlet 10 and the outlet 16. In one configuration, the retention time of the aerobic holding treatment tank 12, or the collective retention time of the primary settling tank 12A and secondary settling tank 12B, is approximately 24 hours for a 500 gallon tank volume.

In certain configurations, the outlet 16 of the aerobic holding treatment tank 12, in the single tank or two tank configuration, may be provided in fluid communication with a waste stream purification device, such as a secondary clarifier 20, a UV disinfection device 36, and/or a fine particulate filter 38, as will be described herein. In one embodiment, the secondary clarifier 20 may be a conventional sand filter, wet submersible filter, and/or a discharge field. The secondary clarifier 20 may be provided adjacent the aerobic holding treatment tank 12, such that fluid exiting the aerobic holding treatment tank 12 passes into the secondary clarifier 20, which may, in certain configurations, be disposed below ground level.

The secondary clarifier 20 may include an outlet 22 in fluid communication with a generation pump 24. The generation pump 24 may be provided adjacent the secondary clarifier 20 and/or the aerobic holding treatment tank 12. In one configuration, the generation pump 24 receives the outlet of the secondary clarifier 20. In an alternative configuration, the generation pump 24 receives the outlet of the aerobic holding treatment tank 12. The generation pump 24 may include a holding tank having a reserve volume, such reserve volume being large enough to allow for asynchronous evaporation and filtration. In one configuration, the reserve volume may be 275 gallons.

The generation pump 24 includes an outlet and may be provided in a ground-based module 26 provided at or slightly above ground level. The generation pump 24 may be a high pressure pump, or is provided in fluid communication with a high pressure pump 28 also provided in the ground-based module 26, for providing the effluent wastewater to one or more evaporator misting nozzles 62 provided in an elevated evaporation module 34.

In one configuration, the ground-based module 26 further includes a UV disinfection device 36 through which effluent from at least one of the secondary clarifier 20, or the outlet 16 of the aerobic holding treatment tank 12, is directed to further eliminate and destroy pathogens present in the fluid stream. In one configuration, the wastewater effluent passes through the UV disinfection device 36 prior to being introduced into the high pressure pump 28. UV treated fluid passes from the UV disinfection device outlet in fluid communication to the inlet of the high pressure pump 28.

The ground-based module 26 may also include a fine particulate filter 38 provided in fluid communication with the high pressure pump 28. The fine particulate filter 38 may be a 1-30 μm filter, and in one embodiment, may be a 1 μm filter. In one configuration, effluent from the generation pump 24 may be directed through the fine particulate filter 38 prior to passing through the high pressure pump 28. In one embodiment, effluent from at least one of the secondary clarifier 20, the outlet of the aerobic treatment tank 12, and the outlet of the UV disinfection device 36 is directed through the fine particulate filter 38 having an outlet in fluid communication with the inlet of the high pressure pump 28.

In addition, the ground-based module 26 may also include a flow meter 40 in fluid communication with any of the components defined within the ground-based module 26, including the UV disinfection device 36, the fine particulate filter 38, and the high pressure pump 28, for measuring the output flow volume of the components. The ground-based module 26 may also include inverter electronics 42 and/or back-up power electronics such that the entire system can be powered by standard grid-generated power and/or auxiliary power sources. The ground-based module 26 may also be insulated to guard against heat loss, and may be anchored or ballasted with respect to the ground. In a further configuration, the ground-based module 26 may include an insulating jacket or wrap thereover. In a further configuration, the fluid communication plumbing extending between the generation pump 24 and the high pressure pump 28, can include an insulating jacket or wrap thereover. The insulating wrap may be electrically heated to insure proper water communication in a wide range of climate conditions, including freezing temperatures. In a further configuration, the fluid communication plumbing extending from the generation pump 24 to the evaporator nozzles 62 can include an insulating jacket or wrap thereover.

At least one solar collector 50, such as a plurality of solar collectors 50, may be provided in electrical communication with the ground-based module 26 to power the entire system.

The elevated evaporation module 34 may be provided in fluid communication with the ground-based module 26, including the generation pump 24, the high pressure pump 28, and any finishing stage purifiers, including the UV disinfection device 36 and the fine particulate filter 38. The high pressure pump 28 is configured to drive the purified component of the wastewater processed through the aerobic holding treatment tank 12, secondary clarifier 20, and the UV disinfection device 36, and/or fine particulate filter 38 of the ground-based module 26 to the elevated evaporation module 34, for distribution of the purified component through the air.

The elevated evaporation module 34 may include a fan 60, or a series of fans, having a range of air flow. The elevated evaporation module 34 may also include a nozzle 62, or a series of nozzles positioned adjacent the fan 60, or series of fans. The nozzles 62 direct the purified water stream from the waste stream purification device(s) and pumped by the high pressure pump 28 to the at least one fan 60. In one configuration, a nozzle 62 is provided adjacent each fan 60. In another configuration, a nozzle 62 is provided above each fan 60. In a further configuration, a plurality of nozzles 62 are provided adjacent each fan 60.

The speed of the fans 60 and the volume of purified water exiting the nozzles 62 can be controlled to allow for maximum water evaporation, by creating a mist and minimizing water vapor falling to the ground, over a broad range of weather conditions. By increasing the ratio of air flow, provided by the fan 60 or series of fans 60, to water droplets delivered by the nozzles 62, by a factor of up to ten times that of conventional evaporating systems, the evaporation rate of the water droplets is increased to allow all or nearly all of the water droplets to evaporate into the air stream. To increase the air flow to water droplet ratio, the fan 60 or series of fans 60 are positioned with the series of nozzles 62 above the fan 60 or series of fans 60 to maximize the entrainment of the ambient air into an air cone created by fan 60.

In one embodiment, the elevated evaporation module 34 may be raised from 6-30 feet above the surface of the ground, such as 15-20 feet, such as 8-10 feet above the ground. Optionally, the elevated evaporation module 34 may be roof-top mounted.

The elevated evaporation module, in one example, also optimizes the diameter of the water droplets using nozzles designed to form 100 μm diameter water droplets. These nozzles 62 may have an output water droplet diameter range of between 50-250 μm in a bell curve distribution with over 50% of the water droplets falling outside of the ideal water droplet diameter range within that distribution. Through careful control of the feed pressure from the high pressure pump 28, the bell curve of the water droplet diameter is tightened to force all water droplet diameters to fall within the ideal water droplet size range allowing for maximum evaporation.

The elevated evaporation module 34, in one example, also continuously spreads the water and airflow so that water droplet collision is reduced. By reducing collisions, the water droplets maintain uniformity of size, allowing for more thorough evaporation.

The output volume of water to be evaporated from the system is intended to meet the flow requirements of the particular application, meeting and/or exceeding current EPA NPDES water quality guidelines.

What is claimed is:

1. A wastewater treatment system, comprising:

a waste holding tank, having an inlet for receiving a waste stream, and an outlet for directing a fraction of the waste stream from the waste holding tank;

a waste stream purification device having an inlet for receiving the fraction of the waste stream from the waste holding tank;

an exposed elevated evaporation module provided above ground and comprising at least one fan and at least one fluid directing nozzle adjacent the at least one fan, wherein the at least one fluid directing nozzle is provided above the at least one fan, wherein the at least one fan and the at least one fluid directing nozzle are elevated above the waste holding tank, and wherein the at least one fan and the at least one fluid directing nozzle of the exposed elevated evaporation module are raised above the ground from about 6 feet to about 30 feet;

a ground based module including a pressure pump, the pressure pump having an inlet provided in fluid communication with an outlet of the waste stream purification device for directing a purified treated water stream from the waste stream to the exposed elevated evaporation module; and a generation pump receiving the outlet of the waste stream purification device, wherein the outlet of the waste holding tank directs the fraction of the waste stream in a first direction, wherein the exposed elevated evaporation module is positioned above the ground based module such that the purified treated water stream exits the ground based module in a second direction substantially perpendicular to the first direction, wherein the at least one fluid directing nozzle is configured for directing the purified treated water stream from the waste stream purification device and pumped by the pressure pump to the at least one fan, and wherein the at least one fan and the at least one fluid directing nozzle are configured to form a mist from the purified treated water stream.

2. The wastewater treatment system of claim 1, wherein the waste holding tank comprises a primary settling tank and a secondary settling tank.

3. The wastewater treatment system of claim 1, wherein the waste holding tank comprises a primary settling region and a secondary settling region.

4. The wastewater treatment system of claim 1, wherein the waste stream purification device comprises a secondary clarifier in fluid communication with the outlet of the waste holding tank.

5. The wastewater treatment system of claim 4, wherein the generation pump is in fluid communication with at least one of the outlet of the waste holding tank and an outlet of the secondary clarifier, the generation pump having an outlet in fluid communication with the inlet of the pressure pump.

6. The wastewater treatment system of claim 1, wherein the waste stream purification device comprises a UV disinfection device.

7. The wastewater treatment system of claim 6, wherein an effluent from at least one of a secondary clarifier and the outlet of the waste holding tank is directed through the UV disinfection device, the UV disinfection device having an outlet in fluid communication with the inlet of the pressure pump.

8. The wastewater treatment system of claim 1, wherein the waste stream purification device comprises a fine particulate filter.

9. The wastewater treatment system of claim 8, wherein an effluent from at least one of a secondary clarifier, the outlet of the waste holding tank, the generation pump, and an outlet of a UV disinfection device is directed through the fine particulate filter, the fine particulate filter having an outlet in fluid communication with the inlet of the pressure pump.

10. The wastewater treatment system of claim 1, further comprising at least one solar collector provided in electrical communication with at least one of the pressure pump and the exposed elevated evaporation module for providing a source of power thereto.

11. The wastewater treatment system of claim 1, wherein the mist comprises water droplets having a diameter of between 50 μm and 250 μm.

12. The wastewater treatment system of claim 1, wherein the ground based module is above ground level.

13. A wastewater treatment system, comprising:
a waste holding tank, having an inlet for receiving a waste stream, and an outlet for directing a fraction of the waste stream from the waste holding tank;

a secondary clarifier in fluid communication with the outlet of the waste holding tank, the secondary clarifier having an outlet;

a generation pump in fluid communication with the outlet of the secondary clarifier, the generation pump having an outlet;

an exposed elevated evaporation module provided above ground and comprising at least one fan and at least one fluid directing nozzle adjacent the at least one fan, wherein the at least one fluid directing nozzle is provided above the at least one fan, wherein the at least one fan and the at least one fluid directing nozzle are elevated above the waste holding tank, and wherein the at least one fan and the at least one fluid directing nozzle of the exposed elevated evaporation module are raised above the ground from about 6 feet to about 30 feet; and a ground based module including a pressure pump, the pressure pump having an inlet provided in fluid communication with the outlet of the generation pump for directing a purified treated water stream from the waste stream to the exposed elevated evaporation module, wherein the outlet of the waste holding tank directs the fraction of the waste stream in a first direction, wherein the exposed elevated evaporation module is positioned above the ground based module such that the purified treated water stream exits the ground based module in a second direction substantially perpendicular to the first direction, wherein the at least one fluid directing nozzle is configured for directing the purified treated water stream from a waste stream purification device and pumped by the pressure pump to the at least one fan, and wherein the at least one fan and the at least one fluid directing nozzle are configured to form a mist from the purified treated water stream.

14. The wastewater treatment system of claim 13, further comprising a UV disinfection device, wherein an effluent from the generation pump is directed through the UV disinfection device, the UV disinfection device having an outlet in fluid communication with the inlet of the pressure pump.

15. The wastewater treatment system of claim 13, further comprising a fine particulate filter, wherein an effluent from the generation pump is directed through the fine particulate filter, the fine particulate filter having an outlet in fluid communication with the inlet of the pressure pump.

16. The wastewater treatment system of claim 13, wherein the mist comprises water droplets having a diameter of between 50 μm and 250 μm.

17. A wastewater treatment system, comprising:
a waste holding tank, having an inlet for receiving a waste stream, and an outlet for directing a fraction of the waste stream from the waste holding tank;

a waste stream purification device having an inlet for receiving the fraction of the waste stream from the waste holding tank;

an exposed elevated evaporation module provided above ground and comprising at least one fan and at least one fluid directing nozzle adjacent the at least one fan, wherein the at least one fluid directing nozzle is provided above the at least one fan, wherein the at least one fan and the at least one fluid directing nozzle are elevated above the waste holding tank, and wherein the at least one fan and the at least one fluid directing nozzle of the exposed elevated evaporation module are raised above the ground from about 6 feet to about 30 feet;

a ground based module being above ground level and including a pressure pump, the pressure pump having an inlet provided in fluid communication with an outlet of the waste stream purification device for directing a purified treated water stream from the waste stream to the exposed elevated evaporation module; and a generation pump receiving the outlet of the waste stream purification device, wherein the at least one fluid directing nozzle is configured for directing the purified treated water stream from the waste stream purification device and pumped by the pressure pump to the at least one fan, and wherein the at least one fan and the at least one fluid directing nozzle are configured to form a mist from the purified treated water stream.

* * * * *